Oct. 25, 1927.
T. M. EYNON
1,646,957
LIQUID LEVEL INDICATOR
Filed Jan. 4, 1923
2 Sheets-Sheet 1
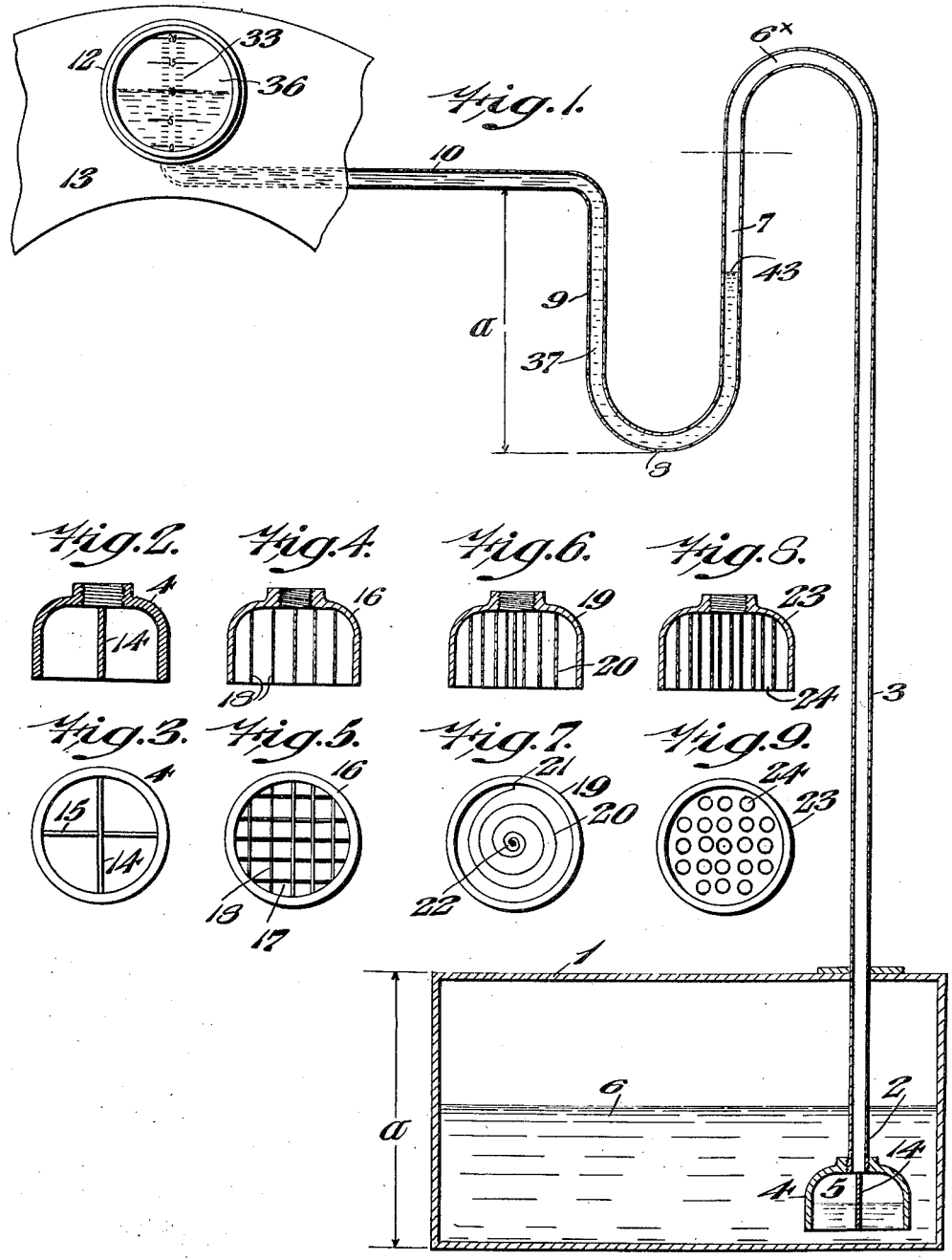

Oct. 25, 1927. 1,646,957
T. M. EYNON
LIQUID LEVEL INDICATOR
Filed Jan. 4, 1923  2 Sheets-Sheet 2
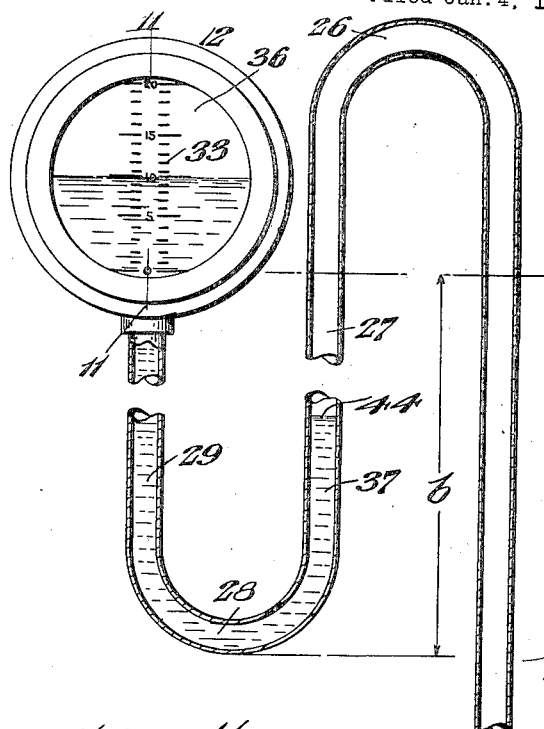
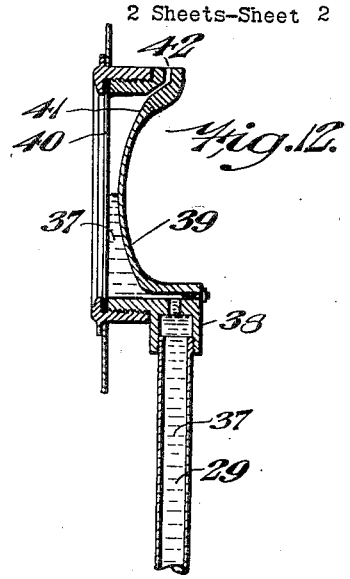
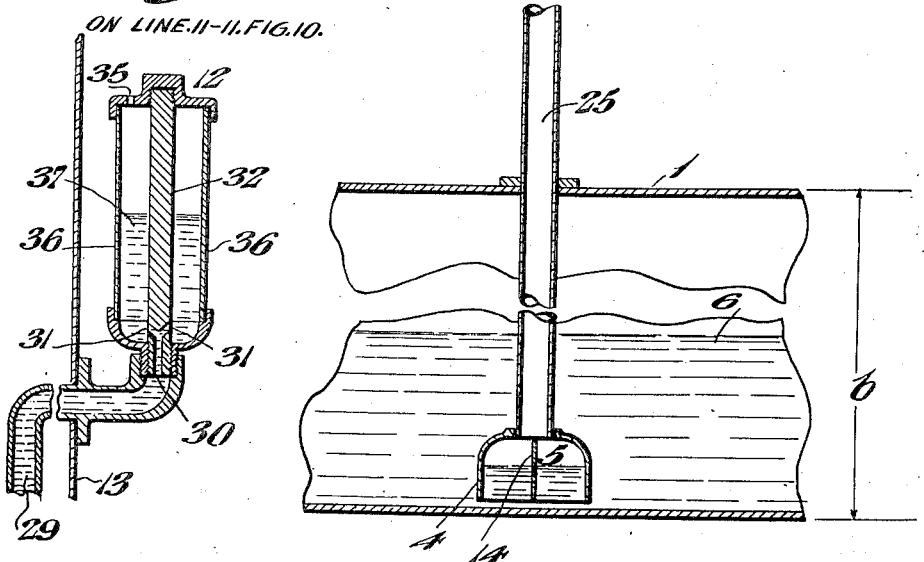
INVENTOR:
Thomas M. Eynon,
By
Niedersheim Fairbanks
ATTORNEYS.

Patented Oct. 25, 1927.

1,646,957

UNITED STATES PATENT OFFICE.

THOMAS M. EYNON, OF PHILADELPHIA, PENNSYLVANIA.

LIQUID-LEVEL INDICATOR.

Application filed January 4, 1923. Serial No. 610,556.

My invention relates to a novel liquid level indicator, which can be readily installed upon automobiles or other self propelled vehicles or upon tanks of any standard or conventional type without change therein, whereby the height or level of the gasoline or other liquid will be visually indicated with great accuracy at the desired point through the agency of a fluid medium, whereby the use of rods, links and other mechanical connections is entirely dispensed with.

In carrying out my invention, I employ a U-shaped tube adapted in the case of an automobile to be secured upon the instrument board at any desired point, said U-shaped tube communicating with a pipe leading from the gasoline or other tank, whose lower terminal is positioned within said tank and provided with a partitioned inverted bell or cup shaped member, whereby a body of air or an air cushion is at all times contained in said bell member and said U-shaped tube being of substantially the same vertical length as the height of the gasoline tank. The broad principle of my invention involves the creation of pressure within a partitioned bell chamber of a gasoline or other tank, the transferral of said pressure to the upper end of a U-shaped tube, whose length corresponds substantially to the depth of the gasoline tank, and the utilization of the pressure or variations of pressure in the upper end of said U-shaped tube member to cause the level of the liquid in the U-shaped tube members to vary according to the variations of pressure within the bell terminal of the gasoline tank, whereby all variations of level of the liquid in the tank are accurately and instantly indicated at the desired point through the medium of the liquid in the other member of said U-shaped tube.

It further consists of a novel construction of a bell or inverted cup shaped chamber, adapted to be submerged in the liquid whose height is to be ascertained, said bell being provided with upright partitioning devices, which may be in the form of a plate or plates angularly arranged tubes or a spiral, helical or convoluted plate whereby the liquid is prevented from escaping from the bell within the tank under all conditions of use.

It further consists, in conjunction with the gasoline or other tank, the bell therein and the small pipe leading therefrom, of a novel construction of a U-shaped tube, having the length of one column a leg thereof, which is filled with liquid, corresponding substantially to the height of said gasoline tank.

It further consists of a novel construction of a gauge or indicating device wherein a stationary upright bar or indicator is employed, provided with a scale on one or both sides, one or both of the outer walls of the gauge being transparent, whereby the necessity for the employment of a movable pointer float or of any mechanically movable element is dispensed with, the reading being indicated by the height of the liquid within the gauge, as contrasted with the scale or indicia on the bar, plate or other indicating device.

It further consists of other novel features of construction, all as will be hereinafter fully set forth.

For the purpose of illustrating my invention, I have shown in the accompanying drawings forms thereof which are at present preferred by me, since they will give in practice satisfactory and reliable results, although it is to be understood that the various instrumentalities of which my invention consists can be variously arranged and organized and that my invention is not limited to the precise arrangement and organization of these instrumentalities as herein shown and described.

Figure 1 represents a vertical sectional view of a gasoline indicator, embodying my invention, certain of the parts being shown in elevation.

Figure 2 represents in detached position a vertical sectional view of the bell or inverted cup seen in Figure 1.

Figure 3 represents a bottom plan view of Figure 2.

Figure 4 represents a vertical sectional view of a bell similar to the bell seen in Figures 1 and 2, but showing a plurality of partitions therein arranged at right angles to each other.

Figure 5 represents a bottom plan view of Figure 4.

Figure 6 represents a vertical sectional view, showing a bell having therein a spiral or helical or convoluted partition.

Figure 7 represents a bottom plan view of Figure 6.

Figure 8 represents a vertical sectional view of a bell having a plurality of vertical tubes open at their bottom therein.

Figure 9 represents a bottom plan view of Figure 8.

Figure 10 represents a vertical sectional view of another embodiment of my invention, somewhat similar to Figure 1, but showing the upper end of one column of the U-shaped tube connected directly to the indicating device.

Figure 11 represents a section on line 11—11 of Figure 10.

Figure 12 represents a vertical sectional view of another form of gauge or indicating device, slightly different from that seen in Figure 11.

Similar numerals of reference indicate corresponding parts in the figures.

Referring to the drawings:

In carrying out my invention, reference being first had to Figure 1, I locate in the gasoline or other tank 1, the lower end 2 of the pipe 3, said end 2 being connected with an inverted cup shaped vessel or bell 4, which is open at its lower end, whereby an air or pressure chamber 5 is created when the bell is immersed in the gasoline or other liquid 6, whose level is to be ascertained as will be understood from Figures 1 and 2.

The other or upper end of the pipe 3 in the construction seen in Figure 1, is reversely bent at the point 6 and is continued to form the vertical column 7, which is bent upwardly at the point 8 to form the vertical column 9, from which extends the lateral limb 10 to the gauge or indicating device 12 which in the case of an automobile will be mounted upon the dash board 13, and has an internal capacity equal to the volume of one leg of the U-tube.

In practice I make the leg or column 9 of substantially the same height as the depth of the tank 1, for reasons which will be hereafter explained, as indicated at the points $a$ in Figure 1.

The detailed construction of the bell 4 will be apparent from Figures 2 and 3, and for the purpose of preventing the liquid whose height is to be indicated, from escaping from the bell, I provide, in the construction seen in Figures 1, 2 and 3, a pair of upright partitions 14 and 15 which are arranged at right angles, as will be understood from Figure 3.

In the construction seen in Figure 4, I have shown the bell 16 as provided with a plurality of upright partitions 17 and 18 arranged at right angles, and in Figures 6 and 7, I have shown the bell 19 as provided with a helical, or convoluted upright partition 20, its outer end being secured to the inner wall of the bell, as indicated at 21, in Figure 7, while the inner end of said partition terminates at about the center of the bell as indicated at 22.

In Figure 8, I have shown the bell 23, as provided with a plurality of tubes 24, which are open at their lower ends and may be secured at their upper ends to the top of the bell in any suitable manner, as by brazing, welding, spot welding or the like.

The object of the construction seen in Figures 2 to 9 is to reduce the volume of liquid within the bell into a number of smaller units,—thus increasing the friction and reducing its momentum and thereby reducing its agitation and consequently the loss of liquid from the bell,—caused by any unduly and violent movement of the vehicle, so that the desired variations of the level of the liquid 6 in the tank will always be properly indicated as will be hereafter explained.

In the construction seen in Figure 10, I have shown a slight modification of the construction seen in Figure 1, 1 representing the gasoline tank as before, 6 the gasoline or other liquid to be measured, and the bell 4 is provided with the pressure chamber 5 of the same function and character as already described.

The pipe 25, however, which leads from the pressure chamber 5, is bent downwardly at 26, so as to form the column 25 which is bent at 28, so as to form the upwardly extending column 29, whose upper terminal leads through the port 30 to the side ports 31 in the upright bar or plate 32, which has the indicia 33 on one or both sides thereof as indicated in Figures 1 and 10. The height $b$ of the tube corresponds to the depth $b$ of the tank in Figure 10.

The indicating plate 32 is contained within the gage 12 having the port 35 therein and the sides or walls 36 are transparent so that the height of the liquid 37 can be at all times readily read or ascertained.

In the construction seen in Figure 12, the upper end of the leg or column 29 of the U-tube is shown as leading to a suitable fitting 38 having a concave or other shaped back 39, in front of which is the transparent plate 40, between which and said back 39 is contained the liquid 37, it being apparent that the inner face of the transparent wall 40 may be provided with indicia, so that the height of the liquid 37 can always be readily ascertained. The port 42 seen in Figure 12 has the same function as the port 35, to permit atmospheric pressure upon the top of the liquid 37.

It will be understood that the gage casing 12 seen in Figures 1, 10 and 11 is of preferably the construction shown, but that in lieu thereof, I may employ the gage or indicating device seen in Figure 12.

It will be understood that the liquid 37 seen in Figures 1, 10, 11 and 12 is preferably a suitable vegetable oil, which will not freeze or evaporate and the level of said liquid in the column 7, when the level of the liquid 6 is at about the point indicated, will be about as indicated at 43 in said Figure 1.

The level of the liquid 37 in the leg or column 27 when the level of the liquid 6 is about as indicated in Figure 10, will be approximately as indicated at about the point 44 in said Figure 10.

It will of course be understood that the gages or indicating devices 12 are preferably positioned on or with respect to the instrument board 13, so as to be readily visible to the driver of the automobile at all times.

It will be understood that the internal area of the pressure chamber 5 of the bell or inverted cup member 4 in the gasoline tank 1, is much larger than the cross sectional area of the co-acting U-shaped tube elements, so that when the tank 1 is filled with gasoline or other liquid, the air entrapped in the chamber 5 of the bell will only permit the liquid to rise within the bell, say for example, one inch, while the liquid 37 in either of the U-shaped tubes, due to the pressure of the air in the connecting tubes extending from the tank 1 will have risen, say about four inches.

I have found that if heat is applied to the connecting pipe between the tank and indicating devices that the pressure caused by the expansion of air will not appreciably affect the height or variation of the liquid in the U-shaped tube, for the following reasons:—First, the increased pressure of air in the tube, due to expansion, seeks to find the passage of least resistance and forces the liquid in the bell 4 out into the tank 1. The quantity of liquid forced from the bell is so small in comparison with the quantity of liquid in the tank 1 that it does not appreciably increase the height of the liquid in the tank, therefore, does not disturb the reading shown on the indicating devices.

Second,—when the pressure in the tube is increased by temperature, the head of the liquid in the tank 1 and its corresponding reading on the gauge or indicating devices are not appreciably disturbed, as the following action takes place:—The increased temperature pressure in the tube acts on the surface of the liquid in the bell and because of the difference of the heads forces the liquid into the tank 1 thus automatically taking care of all temperature changes.

I have found by numerous experiments that this operation, if continued under all conditions, will give exactly the same results, namely, the height of the liquid in the U-shaped tube is not affected by variations of temperature or climatic conditions, but varies synchronously or simultaneously with the level of the liquid in the tank, it being apparent that said latter variation causes the pressure within the bell to increase or decrease, and these variations are indicated upon the indicating devices.

It will be readily seen from the foregoing that as the water level or the height of the gasoline or other liquid in the tank varies, a corresponding variation of pressure will be created in the pressure chamber 5 within the bell and that such variation of pressure will be instantly transferred through the tube to the liquid 37, whereupon an instantaneous and accurate corresponding variation of the liquid level in the gage 12 as seen in Figure 11 will occur, so that the variation of the level of the gasoline in the tank 1 will be instantly indicated.

It will be understood that while I have designated the liquid in the U-shaped tubes as being preferably of vegetable oil which does not freeze or evaporate, other liquids having the same or equivalent physical properties or characteristics may be employed.

While I have designed my novel indicator particularly for use in automobiles or other self-propelled vehicles, since the same is capable of being readily installed thereon, without any change or dismantling of any of the standard automobile units, it will be apparent that the broad principle of my invention is applicable to stationary tanks or for indicating the height of variations of level or other liquids than gasoline, and it will be understood that in its broad adaptation, my invention is applicable as an indicator for indicating the variations in level of any other liquid than gasoline, and is equally capable for adaptation to any tank containing such other liquid.

It will be apparent that my invention being operated solely by variations of pressure within the bell is entirely automatic in its operation, and that it dispenses entirely with floats in the gasoline chamber and with all mechanical connections intermediate said float and the indicating devices, so that there is no liability of the apparatus getting out of order after being installed in position, and owing to its great simplicity and the absence of any mechanical connections, it can be readily installed in any standard automobile without the employment of skilled labor and without dismantling or taking down of any of the standard automobile units, it being immaterial whether the gasoline tank is located at the rear of the automobile, or in any other position upon the chassis.

It will be apparent from the foregoing, that my novel indicator is not affected by changes in temperature or altitudes, no special chemical fluid is required, no float is necessary in the tank, there is no liquid in the pipe running from the tank to the instrument board, except in the U portion thereof, it can be used on all makes and positions of gasoline tanks, and its operation is not affected by the varying positions or inclinations of gasoline tanks during the progress of the automobile up or down grades, hills, mountains or the like.

By making the length of the leg or column 9 or 29 of the U-shaped tubes which are located near the instrument board substantially the same as the depth of the gasoline tank, as indicated at $a$ and $b$ in Figures 1 and 10, I transfer in effect to the front part of the automobile in miniature the gasoline tank.

It will also be understood that the area of the gage on the instrument board is large enough to contain all the liquid that is forced from one leg of the U-shaped tube and the dimensions of the gage are still small enough to enable it to be located on the instrument board.

I have found in practice that by proportioning the length of the column 9 or 29, so that it will be essentially the same as the depth of the tank 1, that when heat is applied to the pipe running from the bell to the U-shaped tube, the expansion of the air will force the liquid in the bell thence into the tank and will not affect the height of the liquid in the gage 12, so that my device will register quickly and accurately under all conditions the height or level of the liquid 6 in the tank 1.

It will now be apparent that I have devised a novel and useful liquid level indicator which embodies the features of advantage enumerated as desirable in the statement of the invention and the above description, and while I have, in the present instance, shown and described a preferred embodiment thereof which will give in practice satisfactory and reliable results, it is to be understood that such embodiment is susceptible of modification in various particulars without departing from the spirit or scope of the invention or sacrificing any of its advantages.

Having thus described my invention what I claim as new and desire to secure by Letters Patent, is:—

1. In a gasoline indicator, a tank, an inverted bell therein, having its lower edge removed from the bottom of said tank, a partitioning device arranged vertically in said bell for preventing the escape of liquid therefrom, an indicating device, and a pipe leading upwardly from said bell to said indicating device, and having a U-shaped tube therein of a height substantially the same as the height of said tank.

2. In a liquid level indicator, a tank, an inverted bell therein removed from the bottom of said tank and having a vertical, central partition, a pipe leading upwardly from said bell, said pipe straddling said partition, and having a reversed U-shaped portion, one leg of which is of substantially the same length as the depth of said tank, an indicating device, and a connection from said U-shaped portion to said indicating device.

THOMAS M. EYNON.